Patented Nov. 17, 1936

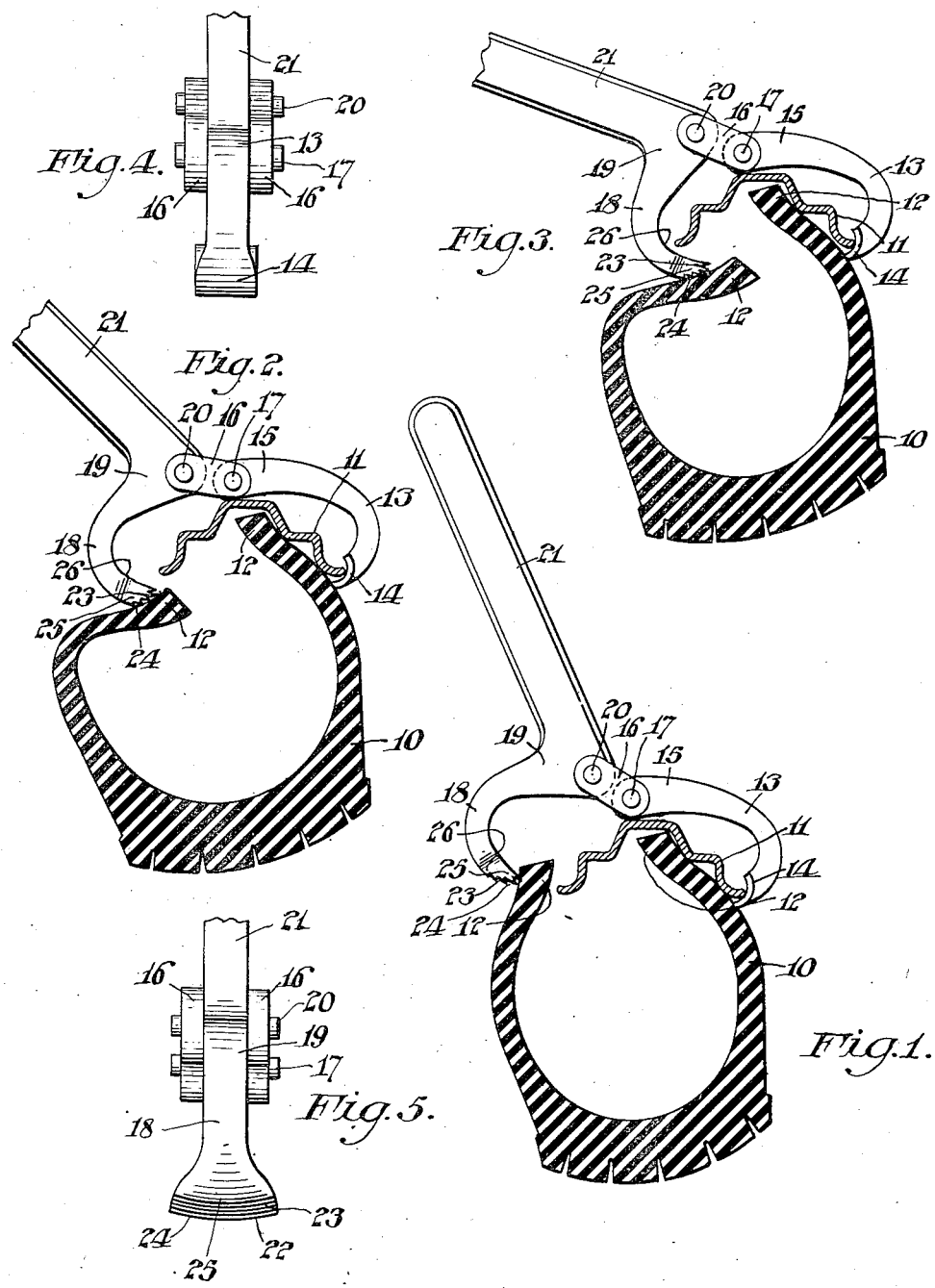

2,061,274

UNITED STATES PATENT OFFICE 2,061,274

TIRE WRENCH

Emil Horn, East Falls, Pa.

Application October 12, 1935, Serial No. 44,668

2 Claims. (Cl. 157—6)

The invention relates to tire wrenches and more particularly to an improved tire tool which will be simple in construction but sturdy and reliable in operation.

An object of the invention is to provide a tire wrench particularly adapted for quickly and easily mounting a tire casing on the rim of a vehicle wheel. A further object of the invention is to provide a tire wrench by which an improved tire applying action may be obtained. Other objects of the invention will appear from the annexed specification and claims.

The particular features of the invention will be more readily understood from the following description, taken in connection with the accompanying drawing forming part hereof, in which:

Figure 1 is a side elevation of a preferred embodiment of the invention and showing the wrench in one position in the mounting of a tire casing on a wheel rim;

Figs. 2 and 3 are fragmentary views showing different positions of the wrench during the applying of a tire casing to a wheel rim and show the manner in which the tire casing is manipulated during the applying;

Fig. 4 is a fragmentary rear elevation showing the rim engaging hook member as viewed from the right in Fig. 1; and Fig. 5 is a fragmentary elevation of the tire casing engaging member as viewed from the left in Fig. 1.

It will, of course, be understood that the description and drawing herein contained are illustrative merely, and that various changes and modifications may be made in the structure disclosed without departing from the spirit of the invention.

Referring more particularly to the drawing, in order that the invention may be more easily understood, a sectional view of a pneumatic tire casing, as at 10, and a rim 11 of a wheel which is adapted to receive the beads 12 of the pneumatic tire casing 10 have been illustrated. It will be understood that the wrench of the present invention is not limited in use, however, to the specific form of tire casing and rim illustrated.

A preferred embodiment of the invention is shown in the drawing. The tire wrench comprising the present invention includes a hooked member 13 having a widened and grooved end portion 14 for direct engagement with an edge portion of the rim 11. The other end portion 15 of the hooked member 13 is preferably provided with parallel flat faces with a bearing aperture therethrough. The hooked shape of the member 13 permits of the proper pivotal action with respect to the rim.

A link member is provided which may comprise one or more straight pieces 16 bearing on the flat faces of the end portion 15 with apertures therethrough adjacent the ends. The link member is held in pivotal relationship with the hooked member 13 by a bearing pin 17 which extends through the apertures at one end of the link pieces 16 and through the aperture in the end portion 15. The pin 17 has been shown as a rivet, but it will, of course, be understood that a suitable bolt and nut may be employed in place of the pin so that a hooked rim engaging member of a different size to accommodate larger or smaller rim or tire casing sizes may be substituted if desired.

A hooked tire casing engaging member 18 is provided and has parallel flat faces 19 with a bearing aperture therethrough. A bearing pin 20 passes through the apertures of the link members 16 and the aperture between the flat faces 19. This hooked member 18 has a handle as at 21 for manual operation of the wrench in the manner hereinafter pointed out. The end portion of the hooked member 18 which is adapted for direct engagement with the tire casing has a slight curvature, as at 22, which will be particularly apparent from Fig. 5, and is provided with a series of parallel grooves 23 conforming to the curved end 22. The outwardly extending ridges 24 are adapted to frictionally grip the casing and prevent movement of the end portion 25 with respect to the casing. This shaping of the end portion 25 of the hooked member 18 provides for gripping of the tire casing 10 at all times and in all positions of the hooked member 18 during the applying of the casing to the rim.

The internal edge 26 of the hooked member 18 is concave in order to prevent any undesired engagement of that edge with the rim 11.

The operation of the invention will now be pointed out. The tire casing 10 which it is desired to mount on the rim 11 is first manipulated manually in the well known manner, so that one of the beads 12 on one side is seated within the rim 11. The grooved end portion 14 of the hooked member 13 is placed in engagement with the edge of the rim 11 at the side where the bead is in position. The handle 21 is grasped and moved to bring the grooved end portion 25 of the hooked member 18 into contact with the exterior side wall of the tire casing 10 adjacent the bead 12. The handle 21 is then partially rotated as indicated in Figs. 2 and 3, the grooved end portion 25 obviating any slipping thereof, with respect to the tire casing 10. It will be noted that the hooked member 18 is rotated about two axes in the applying of a tire, the axis provided by the bearing pin 17 and also the axis provided by the bearing pin 20.

As soon as one arcuate portion of the bead 12 of the tire casing 10 has been brought into a position as in Fig. 3 where it may snap into its seat within the rim 11, the wrench is removed and applied to another unseated portion which is brought to its seat in the rim in the same manner. This operation is repeated at as many points along the rim as is necessary to completely mount the casing 10. The movement of the end portion 25, about the axes provided by the bearing pins 17 and 20, which movement is under the control of the handle 21, provides a quick and directed action in mounting the tire casing 10. At the same time as the movement of the end portion 25 is taking place, the ridges 24 between the grooves 23 provide for a gripping, in all positions, of the outside of the bead 12 of the tire casing 10, so that the same does not slip from the control of the tool. It will be clear, of course, that the wrench may be used horizontally or vertically with the rim detached from the vehicle, or that the tire may also be applied with the rim in its operative position on the vehicle.

I claim:

1. A tire wrench including a rim engaging member, said rim engaging member comprising a C-shaped arm having an end portion thereof widened and grooved for pivotal contact with a wheel rim, and having another end portion; a tire engaging member, said tire engaging member including a C-shaped arm having a ridged outer end face portion curved and inclined with respect to the arm for tire engagement, and having another end portion; a link pivotally connected at its ends to the said other end portions of said arms; and a handle extending from the said other end of the arm of the tire engaging member for advancing and turning the ridged end portion in tire gripping and applying relationship.

2. A tire wrench including a rim engaging portion, a tire engaging member, and means for pivotally connecting the rim engaging portion to the tire engaging member, said means including a link, said tire engaging member including a C-shaped arm terminating at the pivotal connecting means and with an outer end portion remote from said pivotal connecting means, said outer end portion having a convex curvature inclined with respect to the arm and being ridged for tire engagement, the other end portion of the C-shaped arm having a handle extending therefrom for advancing and turning the ridged end portion in tire gripping and applying relationship.

EMIL HORN.